(12) United States Patent
Van Mill et al.

(10) Patent No.: US 9,205,715 B2
(45) Date of Patent: Dec. 8, 2015

(54) FARM IMPLEMENT STEERING SYSTEM WITH INDEPENDENT SUSPENSION

(75) Inventors: Michael D. Van Mill, Shell Rock, IA (US); Ronald J. Schlimgen, Shell Rock, IA (US); John Walvatne, Parkersburg, IA (US)

(73) Assignee: Unverferth Manufacturing Company, Inc., Kalida, OH (US)

( * ) Notice: Subject to any disclaimer, the term of this patent is extended or adjusted under 35 U.S.C. 154(b) by 0 days.

(21) Appl. No.: 13/349,863

(22) Filed: Jan. 13, 2012

(65) Prior Publication Data
US 2013/0181425 A1 Jul. 18, 2013

(51) Int. Cl.
*B60G 3/20* (2006.01)
*B62D 13/04* (2006.01)
*B60G 5/01* (2006.01)

(52) U.S. Cl.
CPC .. *B60G 3/20* (2013.01); *B60G 5/01* (2013.01); *B62D 13/04* (2013.01); *B60G 2200/144* (2013.01); *B60G 2200/44* (2013.01)

(58) Field of Classification Search
CPC ........ B60G 3/20; B60G 5/01; B60G 2200/44; B60G 2200/144; B62D 13/04
USPC ............. 280/124.134, 683, 124.135, 124.141
See application file for complete search history.

(56) References Cited

U.S. PATENT DOCUMENTS

| | | | | |
|---|---|---|---|---|
| 2,827,283 | A * | 3/1958 | Browne et al. | 267/64.23 |
| 5,477,937 | A * | 12/1995 | Chagnon | 180/24.01 |
| 6,764,084 | B1 * | 7/2004 | Nakamura et al. | 280/93.512 |
| 7,980,571 | B2 * | 7/2011 | Chalin et al. | 280/86.5 |

* cited by examiner

*Primary Examiner* — Joseph Rocca
*Assistant Examiner* — Felicia L Brittman
(74) *Attorney, Agent, or Firm* — Rothwell, Figg, Ernst & Manbeck, PC

(57) ABSTRACT

A towable farm implement includes a plurality of wheel assemblies coupled to a frame by a plurality of suspension systems. Each suspension system includes an upper support structure and a lower support structure. Each of the upper and lower support structures have a first end configured to be pivotably coupled to the frame about a first pivot axis parallel to a longitudinal axis of the frame, and a second end pivotably coupled to a portion of the wheel assembly about a second pivot axis parallel to the first pivot axis. Each suspension system further includes a damping device having a first end configured to be pivotably coupled to the frame, and a second end pivotably coupled to the wheel assembly. The damping device is configured to move the wheel assembly generally vertically while maintaining the longitudinal position and, optionally, a steering angle of the wheel.

10 Claims, 8 Drawing Sheets

FARM IMPLEMENT STEERING SYSTEM WITH INDEPENDENT SUSPENSION

BACKGROUND OF THE INVENTION

1. Field of the Invention

The present invention relates generally to farm implement steering systems, and, more specifically, to a novel steering system with independent suspension particularly suitable for towed farm implements such as grain carts.

2. Discussion of the Related Art

Towed farm implements, such as grain carts, seed tenders and header transports, improve harvesting efficiency in many ways. For example, grain carts allow grain to be transported from harvesting equipment in the field to trucks or bins at the side of the field, while the harvesting equipment continues to harvest. Such carts typically include a bin (e.g., a hopper or a box) mounted on a multi-wheeled frame in combination with an auger mechanism for unloading harvested grain from the bin. Carts handle soft or rough fields with ease and are typically drawn by a tractor alongside a combine, which unloads its contents into the cart. This unloading method increases productivity dramatically because combines do not need to stop to unload. In addition, it is unnecessary for the combines themselves to travel to grain trucks or bins at the side of the field each time the combine is full. After a cart is loaded with grain or other material by one or more combines, the material is unloaded from the cart into a bin for temporary storage or into a waiting grain truck for transport to another location, such as a grain elevator. Carts have been widely accepted by farmers and widely produced by equipment manufacturers because of their combination of economy, versatility, production savings, and maneuverability.

In known farm implement suspension systems, each wheel is generally connected to another wheel, such that vertical movement of a wheel on one side of the farm implement causes opposite vertical movement of a wheel on the same side of the farm implement. This is not always effective because, for example, one of the wheels may be lifted off the ground, which can hinder the steering of the implement and force other suspension systems, and the parts of the frame to which those suspension systems are coupled, to bear a greater load. Also, such farm implements are typically towed in close proximity to crops. If a farm implement does not precisely follow a towing vehicle, the farm implement can go off-path and destroy valuable crops. Thus, there is a need for a farm implements able to travel on terrain that is uneven while precisely following a towing vehicle.

Further, known suspension systems for farm implements are constructed of large heavyweight components in order to handle heavy loads. Thus, there is a need for a suspension system that facilitates lighter, less bulky frame construction.

The prior art fails to address these issues. Therefore, there is a need for a new suspension system and steering system for farm implements.

SUMMARY OF THE INVENTION

The present invention overcomes the disadvantages of the prior art by providing an independent suspension system at each wheel that is capable of moving each wheel in a generally vertical direction. The present invention allows for the wheels to stay in contact with the ground even if the ground is uneven. The present invention further includes wheels at a fixed steering angle or a steering system configured to turn each wheel to an angle such that the farm implement will precisely follow a towing vehicle.

In accordance with a first aspect of the present invention a suspension system for a towable farm implement with a frame includes a wheel assembly having upper and lower portions supporting a wheel, wherein the wheel is turnable to a steering angle. The suspension system further includes a upper support structure having a first end configured to be pivotably coupled to the frame about a first upper pivot axis parallel to a longitudinal axis of the frame, and a second end pivotably coupled to the upper portion of the wheel assembly about a second upper pivot axis parallel to the first upper pivot axis. The suspension system also includes a lower support structure having a first end configured to be pivotably coupled to the frame about a first lower pivot axis parallel to the longitudinal axis of the frame, and a second end pivotably coupled to the lower portion of the wheel assembly about a second lower pivot axis parallel to the first lower pivot axis. The suspension system further includes a damping device having a first end configured to be pivotably coupled to the frame, and a second end pivotably coupled to the wheel assembly. The damping device is configured to move the wheel assembly generally vertically. The upper support structure and the lower support structure are configured to maintain a steering angle of the wheel while the wheel assembly is moved by the damping device.

In an embodiment of the present invention, the upper support structure has a narrow end and a broad end, like an A-frame, and the lower support structure has a narrow end and a broad end, like an A-frame. The upper and lower support structures each define an opening between the narrow and broad ends. In an embodiment of the present invention, the damping device extends through the openings such that a portion of the damping device is positioned in the opening of the upper support structure, and a portion of the damping device is positioned in the opening of the lower support structure. In an embodiment of the present invention, the broad end of the upper support structure is configured to be pivotably coupled to the frame about a first upper pivot axis parallel to the longitudinal axis of the frame and the narrow end of the upper support structure is pivotably coupled to the upper portion of the wheel assembly about a second upper pivot axis parallel to the first upper pivot axis. In an embodiment of the present invention, the broad end of the lower support structure is configured to be pivotably coupled to the frame about a first lower pivot axis parallel to the longitudinal axis of the frame and the narrow end of the lower support structure is pivotably coupled to the lower portion of the wheel assembly about a second lower pivot axis parallel to the first lower pivot axis.

In accordance with another aspect of the present invention, a towable farm implement includes a frame having a longitudinal axis extending from a back end to a front end of the implement, and right and left sides. The towable farm implement further includes at least one wheel assembly coupled to the right side of the frame and at least one wheel assembly coupled to the left side of the frame. Each of the wheel assemblies includes a wheel that is either maintained at a fixed steering angle or turnable to a steering angle. Each wheel assembly is coupled to a suspension system that includes an upper support structure having a first end configured to be pivotably coupled to the frame about a first upper pivot axis parallel to a longitudinal axis of the frame, and a second end pivotably coupled to the upper portion of the wheel assembly about a second upper pivot axis parallel to the first upper pivot axis. Each suspension system also includes a lower support structure having a first end configured to be pivotably coupled to the frame about a first lower pivot axis parallel to the longitudinal axis of the frame, and a second end pivotably coupled to the lower portion of the wheel assembly about a second lower pivot axis parallel to the first lower pivot axis. Each suspension system further includes a damping device having a first end configured to be pivotably coupled to the frame, and a second end pivotably coupled to the wheel assembly. The damping device is configured to move the wheel assembly generally vertically. The upper support structure and the lower support structure are configured to maintain a steering angle of the wheel while the wheel assembly is moved by the damping device.

In an embodiment of the present invention, the towable farm implement includes at least two wheel assemblies on each side of the frame suspended as described above. In another embodiment of the present invention, at least three wheel assemblies are suspended on each side of the frame in the above manner. If two or more wheels on each side of the towable farm implement are steerable, the suspension system may also include at least one rocker shaft on each side of the frame configured to translate turning motion of a wheel to at least one other wheel on the same side of the frame. The suspension system may also include a tie rod at each wheel assembly coupled to at least one rocker shaft and configured to transmit rotation of a rocker shaft to the wheel. The suspension system may also include a cross linkage configured to translate the rotation of at least one rocker shaft on a side of the frame to at least one rocker shaft on an opposite side of the frame. In an embodiment, the tie rods are approximately perpendicular to the at least one rocker shaft.

Other objects and advantages of the present invention will be apparent to those of ordinary skill in the art upon review of the detailed description of the preferred embodiments provided herein.

BRIEF DESCRIPTION OF THE DRAWINGS

The accompanying drawings, which are incorporated herein and for part of the specification, help illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION OF THE PREFERRED EMBODIMENTS

The present invention is directed to an independent suspension system for a farm implement with a plurality of wheels or wheel assemblies. In accordance with the present invention, the independent suspension system couples one or more of the wheels or wheel assemblies to the farm implement to improve maneuverability and performance. Each independent suspension system is capable of moving an associated wheel assembly in a generally vertical direction, independent of the movement of any other independent suspension or wheel assembly. In a preferred embodiment, the independent suspension systems are also configured to maintain longitudinal positioning of respective wheels or wheel assemblies. Each independent suspension system can be configured to move its respective wheel assembly in relation to the movement of another independent suspension and wheel assembly, e.g., a first independent suspension moves a first wheel assembly in the opposite direction a second independent suspension moves a second wheel assembly, or a first independent suspension moves a first wheel assembly in the opposite direction a second independent wheel assembly moves a second wheel assembly only after the second independent wheel assembly has moved the second wheel assembly a specific distance, e.g., a quarter of an inch. In an embodiment of the present invention, the farm implement also includes a steering system. Each independent suspension system can be configured to move its respective assembly independent of the other independent suspension systems and wheel assemblies, i.e. the movement is not related to any other independent suspension systems or wheels assemblies. There is a large degree of flexibility in how the independent suspension system can be configured.

The independent suspension system allows each associated wheel to adjust to variations in the terrain, and it more evenly distributes the load transmitted to the frame by the suspension system. The adjustability and more evenly distributed loads allow for a lightweight construction in which bulky and/or heavy materials do not have to be used.

Figure 1:
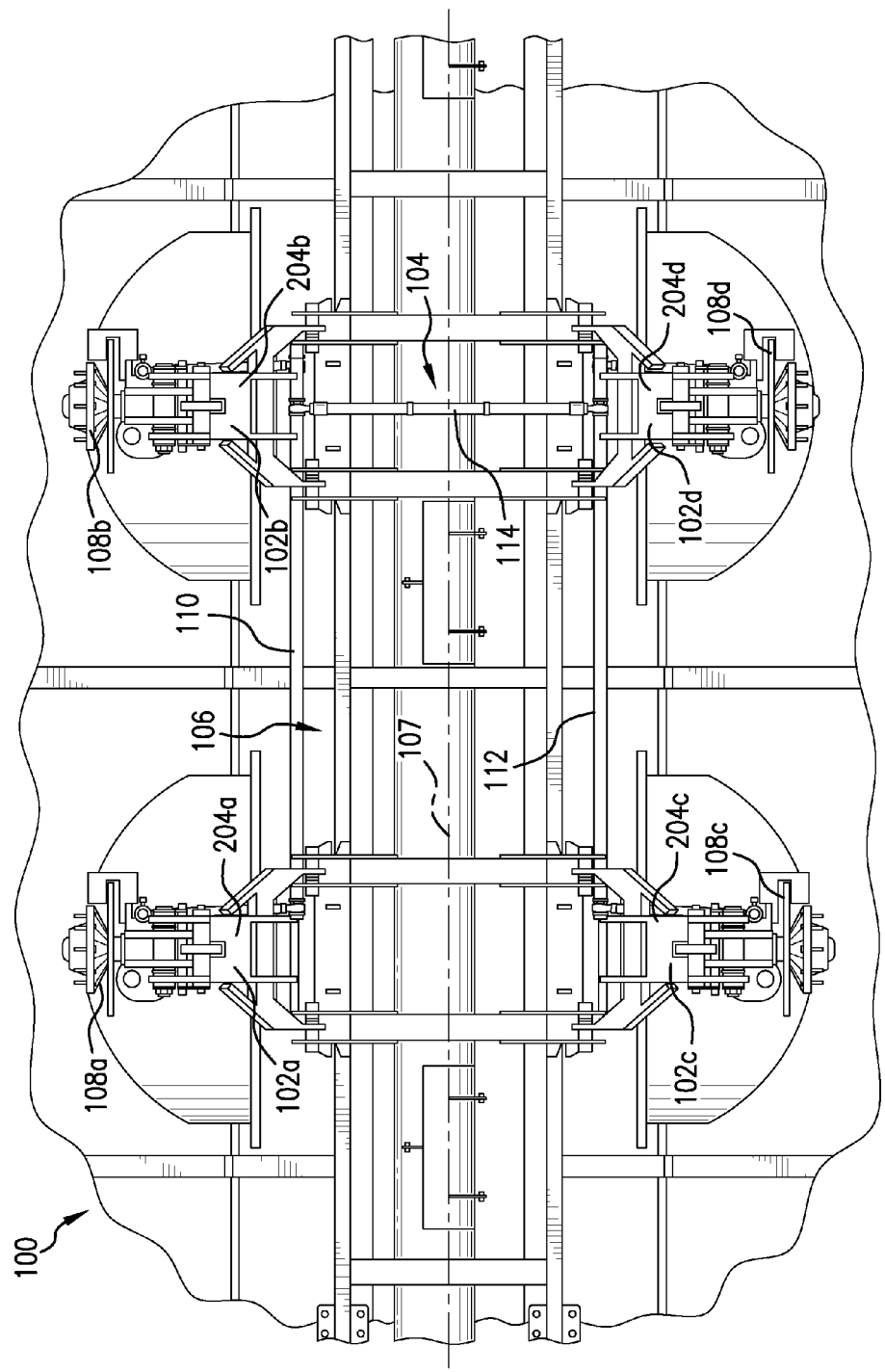
FIG. 1 is a bottom view showing a farm implement with a steering system and independent suspension according to an embodiment of the present invention.

FIG. 1 shows a towable farm implement 100 with a plurality of independent suspension systems 102a-d and an optional steering system 104 according to an embodiment of the present invention. The farm implement includes a frame 106 with a central longitudinal axis 107 and a plurality of wheel assemblies 108a-d coupled to the frame on right and left sides of the longitudinal axis by independent suspension systems 102a-d, respectively. The frame 106 can be configured to support a grain bin (for example, like the grain carts shown in U.S. Pat. No. 7,810,823, the disclosure of which is incorporated herein by reference) or any other type of farm device that is normally towed. A coupling (not shown) connected to the frame allows the implement to be towed behind a tractor or the like. In an embodiment of the present invention, there is an independent suspension 102a-d for each wheel assembly 108a-d. Each independent suspension 102a-d couples a wheel assembly 108a-d to the frame 106 and is configured to move the respective wheel assembly 108a-d in a generally vertical direction without changing its longitudinal position with respect to the frame or its steering angle.

Each suspension system 102a-d includes an upper arm 202a-d, a lower arm 204a-d and a damping device 206a-d. In FIG. 1, only the lower arm 204a-d of each suspension system 102a-d is visible. A more detailed view of the independent suspension systems 102a-d can be seen in FIGS. 2-4. The suspension system 102a-d is configured to allow the wheel assemblies 108*a-d* to move in a generally vertical direction while approximately maintaining the vertical orientation, longitudinal position and steering angle of the wheel. In an embodiment of the present invention, each independent suspension 102*a-d* is capable of moving the associated wheel assembly 108*a-d* in a generally vertical direction, i.e., the suspension system 102*a-d* actively moves the wheel assembly 108*a-d*. In an embodiment of the present invention, the suspension system 102*a-d* is configured to move the wheel assemblies 108*a-d* on a side in a different vertical direction, e.g., the back left wheel assembly 108*c* is moved in the opposite direction the front left wheel assembly 108*d* is moved, and vice versa.

In an embodiment of the present invention, the wheel assemblies 108*a-d* include wheels (not shown) mounted at a fixed steering angle, i.e., mounted to rotate about an axis of rotation transverse to the longitudinal axis of the frame. In another embodiment of the present invention, the wheel assemblies 108*a-d* include wheels (not shown) turnable about a vertical steering axis to a steering angle. In an embodiment of the present invention, the steering system 104 includes a right rocker shaft 110, a left rocker shaft 112 and a cross linkage 114. The steering system 104 is configured to rotate each wheel of the plurality of wheel assemblies 108*a-d* to a steering angle. In an embodiment of the present invention, the steering system 104 can be controlled by an operator via a steering cylinder in the cross linkage 114. The rotation of the right rocker shaft 110 and the left rocker shaft 112 cause the wheels to turn to a steering angle, and the cross linkage 114 links the rocker shafts to coordinate the rotation of the wheels on each side.

Figure 2:
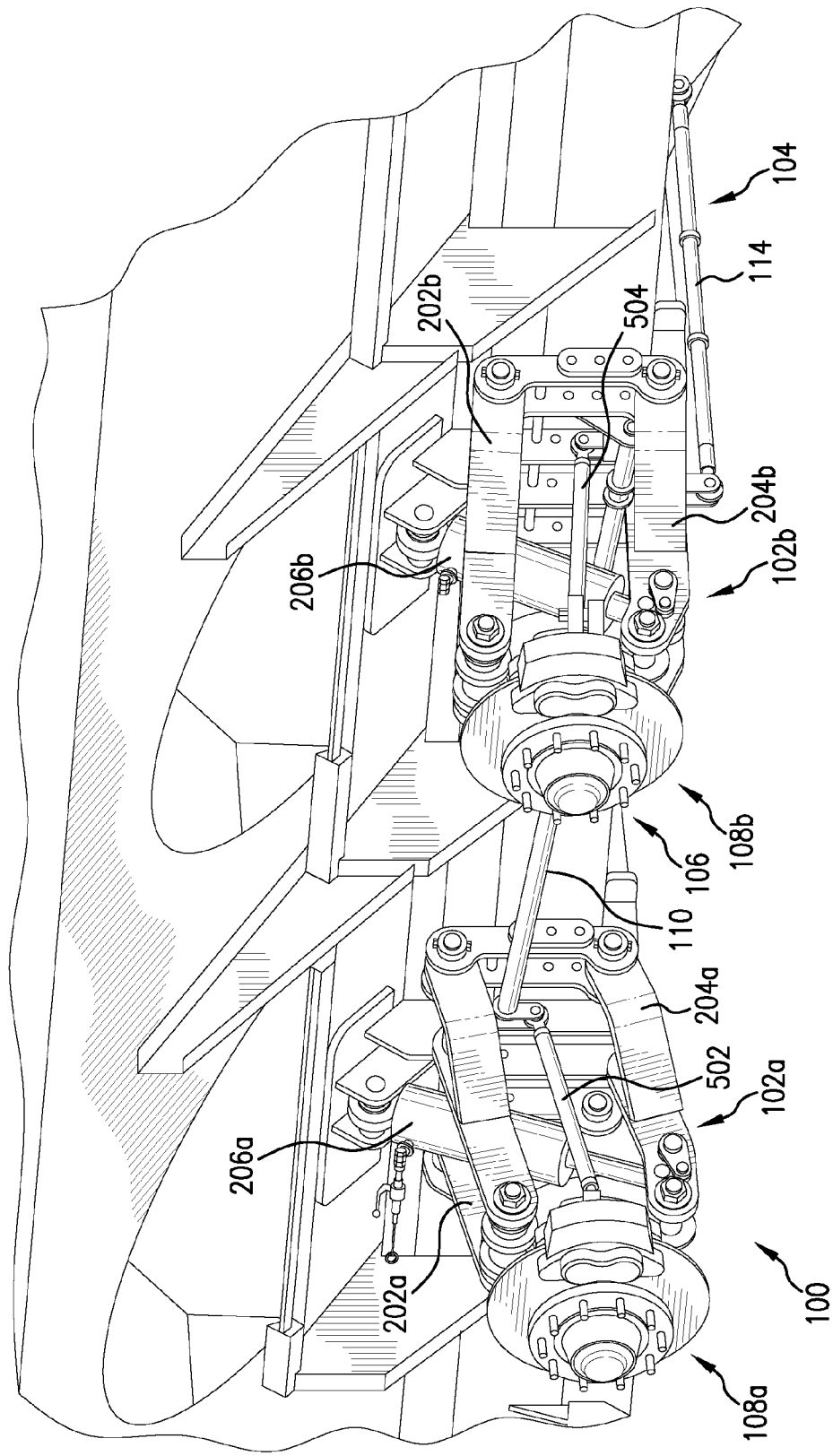
FIG. 2 is a perspective view showing a farm implement with a steering system and independent suspension according to an embodiment of the present invention.

FIG. 2 shows a farm implement 100 with a steering system 104 and independent suspension 102*a-d* according to an embodiment of the present invention. In FIG. 2, the right side of the farm implement 100 is shown, which includes the front right wheel assembly 108*b*, the back right wheel assembly 108*a*, the front right independent suspension 102*b* and the back right independent suspension 102*a*. The right side of the steering system 104 is shown, which includes the right rocker shaft 110, the front right tie rod 504, the back right tie rod 502 and the cross linkage 114.

Each independent suspension 102*a-d* is configured to move a wheel assembly 108*a-d* in a generally vertical direction. Each independent suspension 102*a-d* includes an upper support arm 202*a-d*, a lower support arm 204*a-d* and a damping device 206*a-d*. Each upper support arm 206*a-d* includes a first end pivotably coupled to the frame 106 about a first upper pivot axis parallel to the longitudinal axis of the frame, and a second end pivotably coupled to a wheel assembly 108*a-d* about a second upper pivot axis parallel to the first upper pivot axis. Each lower arm 204*a-d* includes a first end pivotably coupled to the frame 106 about a first lower pivot axis parallel to the longitudinal axis of the frame, and a second end pivotably coupled to a wheel assembly 108*a-d* about a second lower pivot axis parallel to the first lower pivot axis. Each upper arm 202*a-d* and each lower arm 204*a-d* are configured such that each wheel assembly 108*a-d* can move in a generally vertical direction while approximately maintaining a vertical orientation, longitudinal positioning, and steering angle of the wheel. (In the illustrated embodiment, the steering angle will change about 1.5 degrees between the uppermost position of the independent suspension and the lowermost position.) In an embodiment of the present invention, the upper and lower arms can be parallel arm linkages. Each damping device 206*a-d* has a first end pivotably coupled to the frame 106, and a second end pivotably coupled to a wheel assembly 108*a-d*. Each damping device 206*a-d* is configured to move a wheel assembly 108*a-d* in a generally vertical direction. In an embodiment of the present invention, each damping device 206*a-d* can be a hydraulic cylinder that moves a wheel assembly 108*a-d* in a generally vertical direction by extending and retracting.

In an embodiment of the present invention, the independent suspension systems 102*a-d* are configured to move the wheel assemblies 108*a-d* on the same side in opposite directions. For example, as shown in FIG. 2, the front right independent suspension 102*b* is configured to move the front right wheel assembly 108*b* in the opposite direction as the back right independent suspension 102*a* moves the back right wheel assembly 108*a*, and vice versa. As shown in FIG. 2, the front right wheel assembly 108*b* has been moved in a generally upward direction, and the back right wheel assembly 108*a* has been moved in a generally downward direction. In an embodiment of the present invention, the front right independent suspension 102*b* can be configured to only move the front right wheel assembly 108*b* after the back right independent suspension 102*a* has moved the back right wheel assembly 108*a* a certain distance, e.g., a quarter of an inch, from a neutral position.

The steering system 104 is configured to cause the front right wheel and the back right wheel to turn in opposite directions. In an embodiment of the present invention, the front right tie rod 504 is coupled to the opposite side of the right rocker shaft 110 as the back right tie rod 502. The position of the tie rods cause the front right wheel and the back right wheel to turn in opposite directions as the rocker shaft 110 is rotated. The steering system 104 will be discussed in greater detail below.

Figure 3:
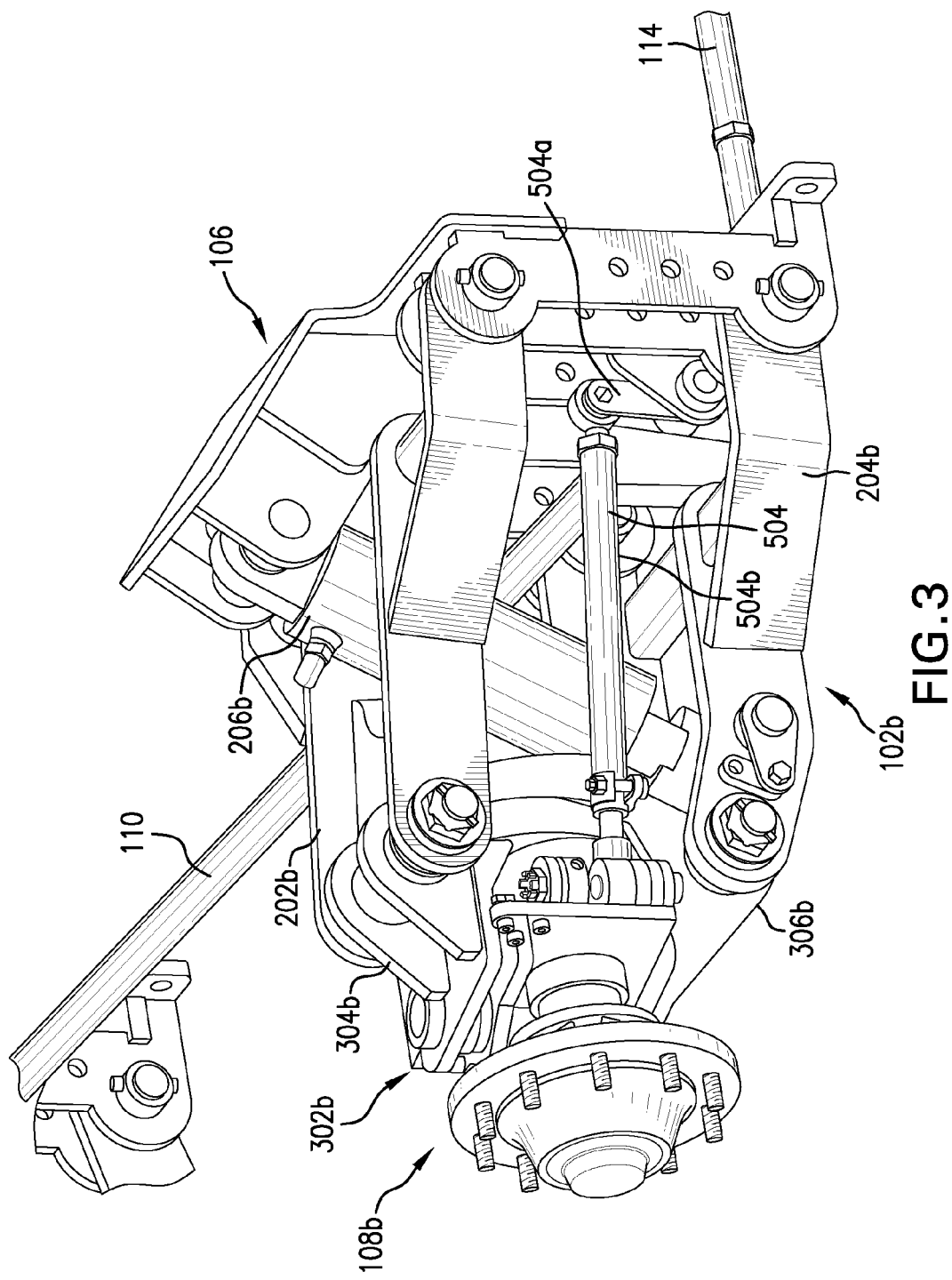
FIG. 3 is a perspective view showing a wheel assembly for a steering system for a farm implement with an independent suspension according to an embodiment of the present invention.
Figure 4:
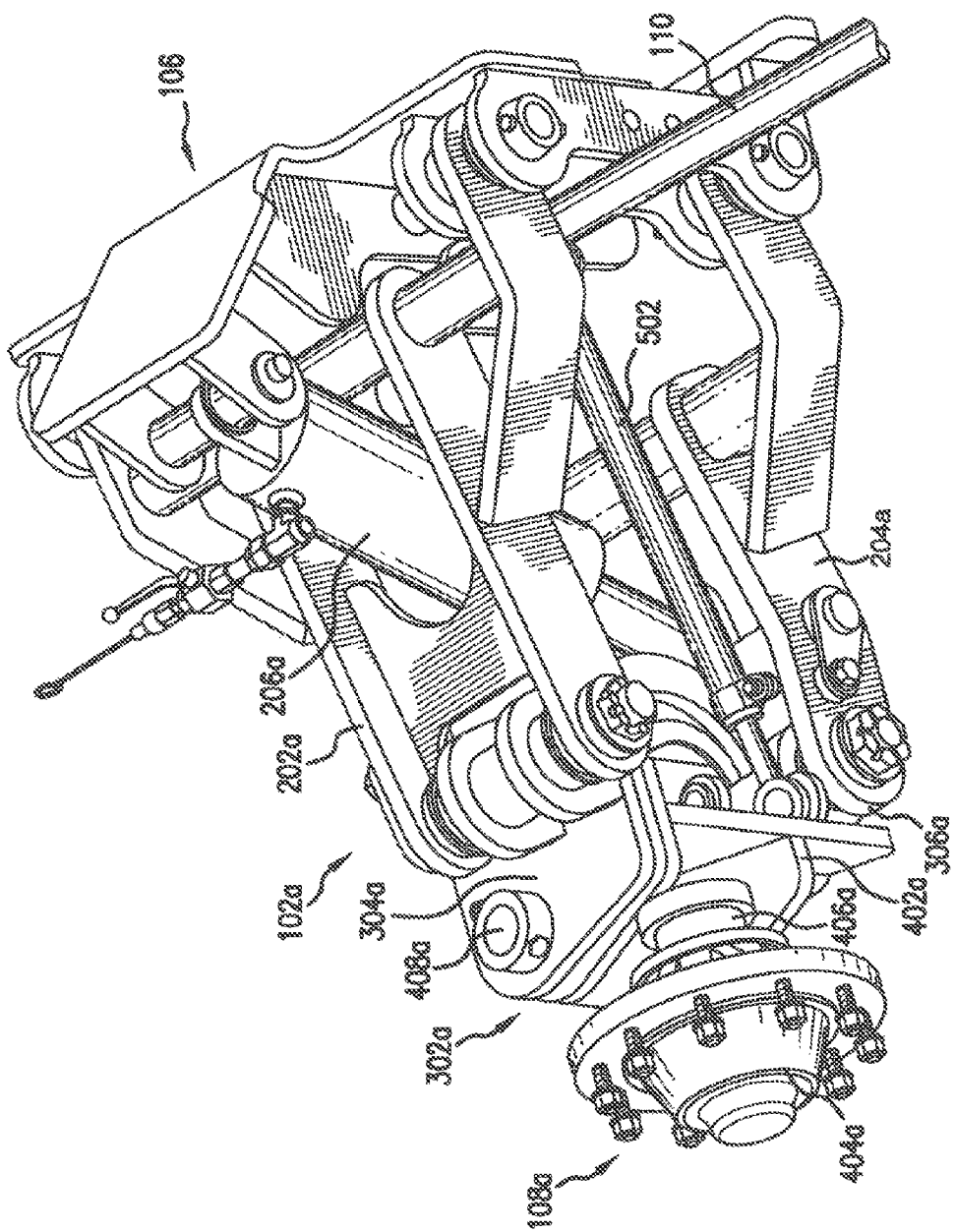
FIG. 4 is a perspective view showing a steering system for a farm implement according to an embodiment of the present invention.

FIGS. 3 and 4 show an independent suspension 102*a-d* according to an embodiment of the present invention. There is an independent suspension 102*a-d* for each wheel assembly 108*a-d*. Each independent suspension 102*a-d* includes an upper arm 202*a-d*, a lower arm 204*a-d* and a damping device 206*a-d*. In an embodiment of the present invention, each wheel assembly includes a wheel assembly frame 302*a-d*, and the upper arm 202*a-d* can be pivotably coupled to the upper portion of the wheel assembly frame 304*a-d*, and the lower arm can be pivotably coupled to the lower portion of the wheel assembly frame 306*a-d*. In an embodiment of the present invention, the upper arm 202*a-d* and the lower arm 204*a-d* can be configured to have broad and narrow ends, e.g., like an A-frame having converging sides and a cross-member. The narrow end of each arm is pivotably coupled to a wheel assembly 108*a-d*, and the broad end of each arm is pivotably coupled to the frame 106. In an embodiment of the present invention, the opposite ends of each arm are coupled to pivot about longitudinal axes parallel to the longitudinal axis of the towed implement. In an embodiment of the present invention, the upper arm 202*a-d* and the lower arm 204*a-d* define openings.

In an embodiment of the present invention, each damping device 206*a-d* can be a hydraulic cylinder, a coil over shock absorber, a spring or an air bag, and a wheel assembly 108*a-d* is moved in a generally vertical direction by the extension and retraction of the damping device. Each damping device 206*a-d* can be positioned in the openings of the upper arm 202*a-d* and the lower arm 204*a-d*. In an embodiment of the present invention, each damping device 206*a-d* can be pivotably coupled to the lower portion of the wheel assembly frame 306*a-d*. In an embodiment of the present invention, each damping device 206*a-d* can also be pivotably coupled to a lower arm 204*a-d* of the independent suspension 102*a-d*. Each damping device 206*a-d* can be configured to move the respective wheel assembly 108*a-d* to which it is coupled. The movement of the independent suspension systems 102a-d has a great degree of flexibility because each independent suspension 102a-d can be configured to move independently or in relation to any other independent suspension 102a-d and/or wheel assembly 108a-d. For example, as discussed above, the independent suspension systems 102a-d can be configured such that the independent suspension systems 102a-d on the same side of the farm implement move their respective wheel assemblies 108a-d in the opposite direction or only after one wheel assembly 108a-d has moved beyond a threshold.

Figure 5:
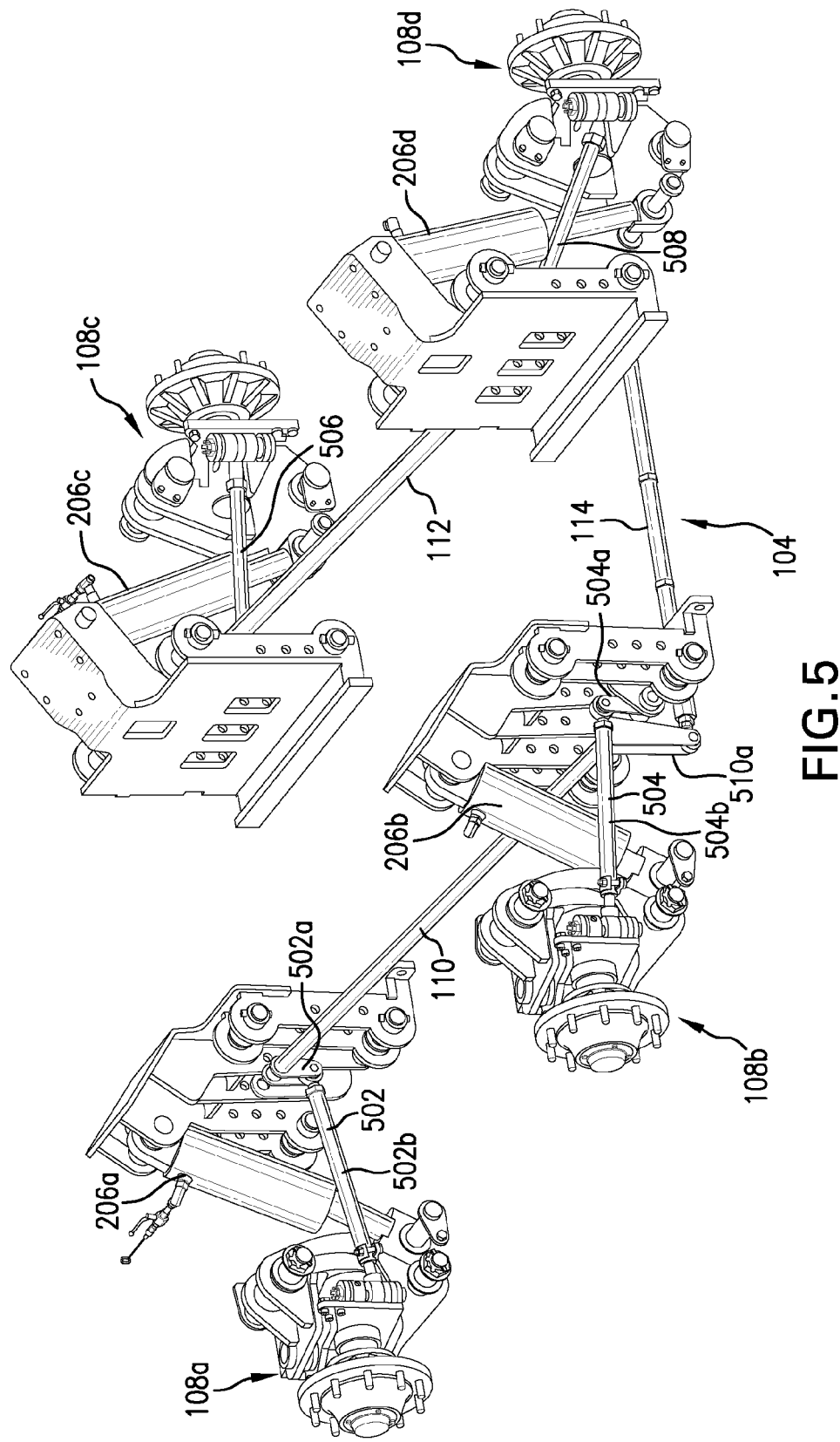
FIG. 5 is a perspective view showing a wheel assembly for a steering system for a farm implement according to an embodiment of the present invention.

FIG. 5 shows a steering system for a farm implement according to an embodiment of the present invention. The steering system includes a right rocker shaft 110, a left rocker shaft 112, a cross linkage 114 and tie rods 502, 504, 506 and 508 at each wheel assembly 108a-d. The right rocker shaft 110 and the left rocker shaft 112 are elongate members that extend between the wheel assemblies 108a-d on each side. The right rocker shaft 108 is at least as long as the distance between the front right wheel assembly 108b and the back right wheel assembly 108a, and the left rocker shaft 112 is at least as long as the distance between the front left wheel assembly 108d and the back left wheel assembly 108c.

The cross linkage 114 translates rotation from the right rocker shaft 110 to the left rocker shaft 112, and vice versa. The cross linkage 114 can be coupled to each rocker shaft by a coupling member 510a-b. Each coupling member 510a-b is fixedly coupled to a rocker shaft such that it rotates with the rocker shaft. The cross linkage 114 is pivotably coupled to each coupling member 510a-b such that, as the coupling member 510a-b is rotated, the cross linkage 114 is pushed or pulled by the coupling member 510a-b, but not rotated. The cross linkage 114 can be a double ended cylinder. In an embodiment of the present invention, the cross linkage 114 can be configured to cause the wheels on the inside of a turn to rotate to a greater steering angle than the wheels on the outside of a turn, e.g., when the farm implement 100 turns right, the front right wheel assembly 108b and the back right wheel assembly 108a will rotate to a greater steering angle than the front left wheel assembly 108d and the back left wheel assembly 108c. In an embodiment of the present invention, the cross linkage 114 can be controlled by an operator. The operator can manipulate the cross linkage 114 such that the wheels actively rotate to a desired steering angle. In another embodiment of the present invention, the steering system can be configured to passively steer the farm implement 100 as it is towed.

At each wheel assembly 108a-d, a tie rod 502, 504, 506 and 508 couples the wheel assembly 108a-d to the rocker shaft. The tie rods 502, 504, 506 and 508 are configured to translate the rotation of the rocker shaft 110 or 112 to the wheel assembly 108a-d such that the wheels are rotated to a steering angle. In an embodiment of the present invention, each tie rod 502, 504, 506 and 508 includes a coupling member 502a, 504a, 506a and 508a and a tie rod member 502b, 504b, 506b and 508b. The coupling member 502a, 504a, 506a and 508a can be fixedly coupled to the rocker shaft 110 or 112 such that, as the rocker shaft 110 or 112 is rotated, the coupling member 502a, 504a, 506a and 508a is rotated with the rocker shaft 110 or 112. The tie rod member 502b, 504b, 506b and 508b is pivotably coupled to the coupling member 502a, 504a, 506a and 508a such that, as the coupling member 502a, 504a, 506a and 508a is rotated, the tie rod 502b, 504b, 506b and 508b is pushed or pulled, but not rotated.

Figure 6:
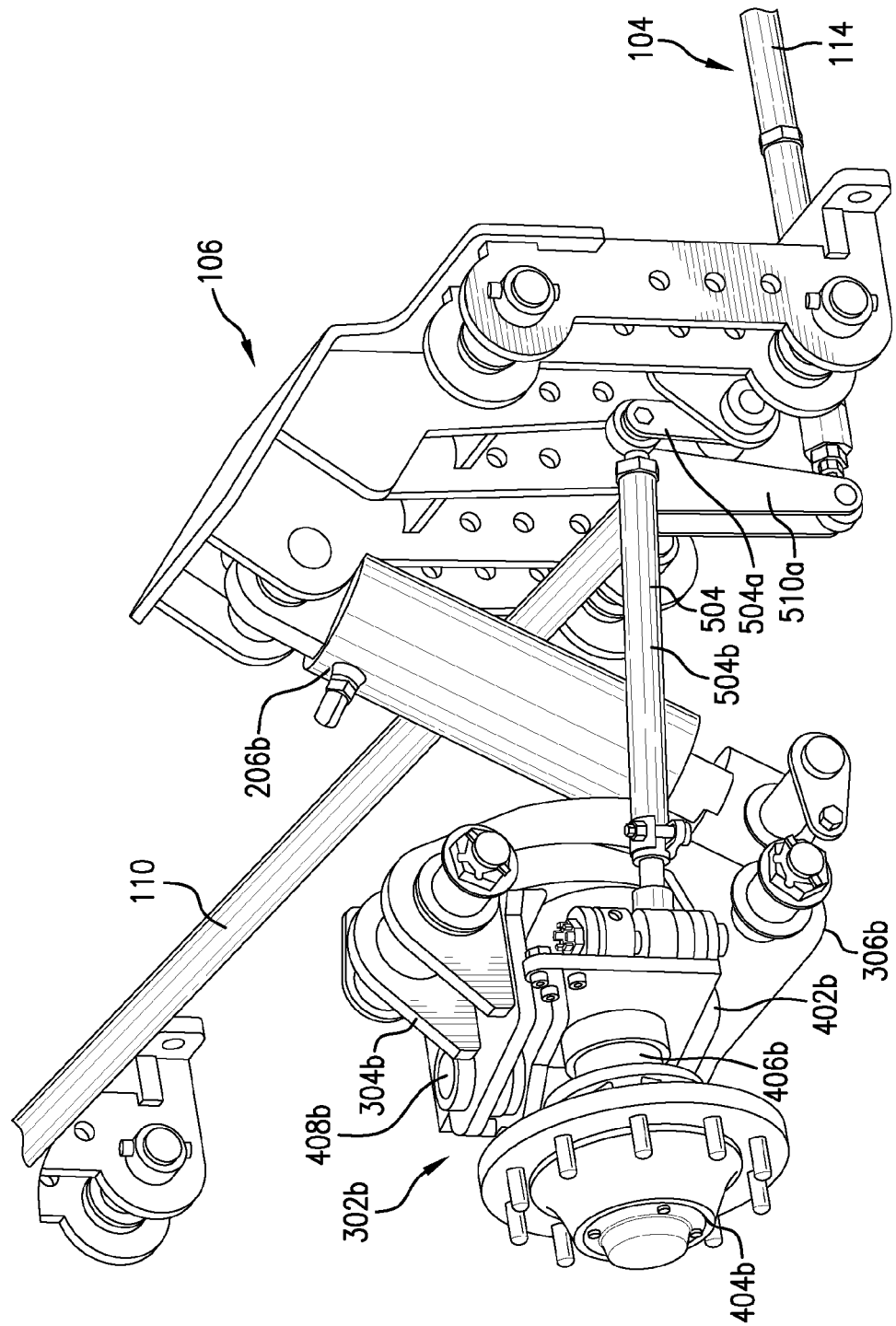
FIG. 6 is a perspective view showing a wheel assembly for a steering system for a farm implement according to an embodiment of the present invention.

FIGS. 4 and 6 show a wheel assembly 108a-d according to an embodiment of the present invention. Each wheel assembly 108a-d includes a wheel assembly frame 302a-d, a wheel support or spindle 402a-d and a hub 404a-d. The wheel support 402a-d can be pivotably coupled to the wheel assembly frame 302a-d such that the wheel support 402a-d can be pivoted about an axis of rotation (e.g., a vertical steering axis). The hub 404a-d can be rotatably coupled to the wheel support 402a-d. In an embodiment of the present invention, an axle 406a-d is fixedly coupled to the hub 404a-d and rotatably coupled to the wheel support 402a-d. A wheel (not shown) can be coupled to the hub 404a-d. The wheel can be rotated to a steering angle by pivoting the wheel support 402a-d about the axis of rotation. In an embodiment of the present invention, a tie rod 502, 504, 506 or 508 can be pivotably coupled to the wheel support 402a-d such that as the rocker shaft 110 or 112 is rotated, the tie rod 502, 504, 506 or 508 pushes or pulls the wheel support 402a-d, which causes the wheel support 402a-d to rotate or pivot about the axis of rotation (e.g., a vertical steering axis).

In an embodiment of the present invention, the wheel assembly frame 302a-d includes an upper portion 304a-d, a lower portion 306a-d and a connecting member connecting the upper portion and the lower portion. The wheel assembly frame 302a-d is approximately a C-shape. A coupling member 408a-d can pivotably couple the wheel support 402a-d to the wheel assembly frame 302a-d. In an embodiment of the present invention, the coupling member 408a-d can pivotably couple the wheel support 402a-d to the upper portion 304a-d and the lower portion 306a-d of the assembly wheel frame. The coupling member 408a-d can be a kingpin.

In operation, the rotation of the wheel support 402a-d of a wheel assembly 108a-d causes a tie rod 502, 504, 506 or 508 to rotate a rocker shaft 110 or 112. The rotation of the rocker shaft 110 or 112 causes the tie rod 502, 504, 506 or 508 on the same side of the farm implement to push or pull a wheel support 108a-d, which causes the wheel to rotate to a steering angle. The rotation of the rocker shaft 110 or 112 also causes the cross linkage 114 to be pushed or pulled. The cross linkage 114 translates the rotation of the rocker shaft 110 or 112 to the rocker shaft 110 or 112 on the opposite side. In an embodiment of the present invention, an operator can actively control the cross linkage 114, and the movement of the cross linkage 114 causes the rocker shafts 110 or 112 to rotate, which then causes the wheels to turn to a steering angle.

Figure 7:
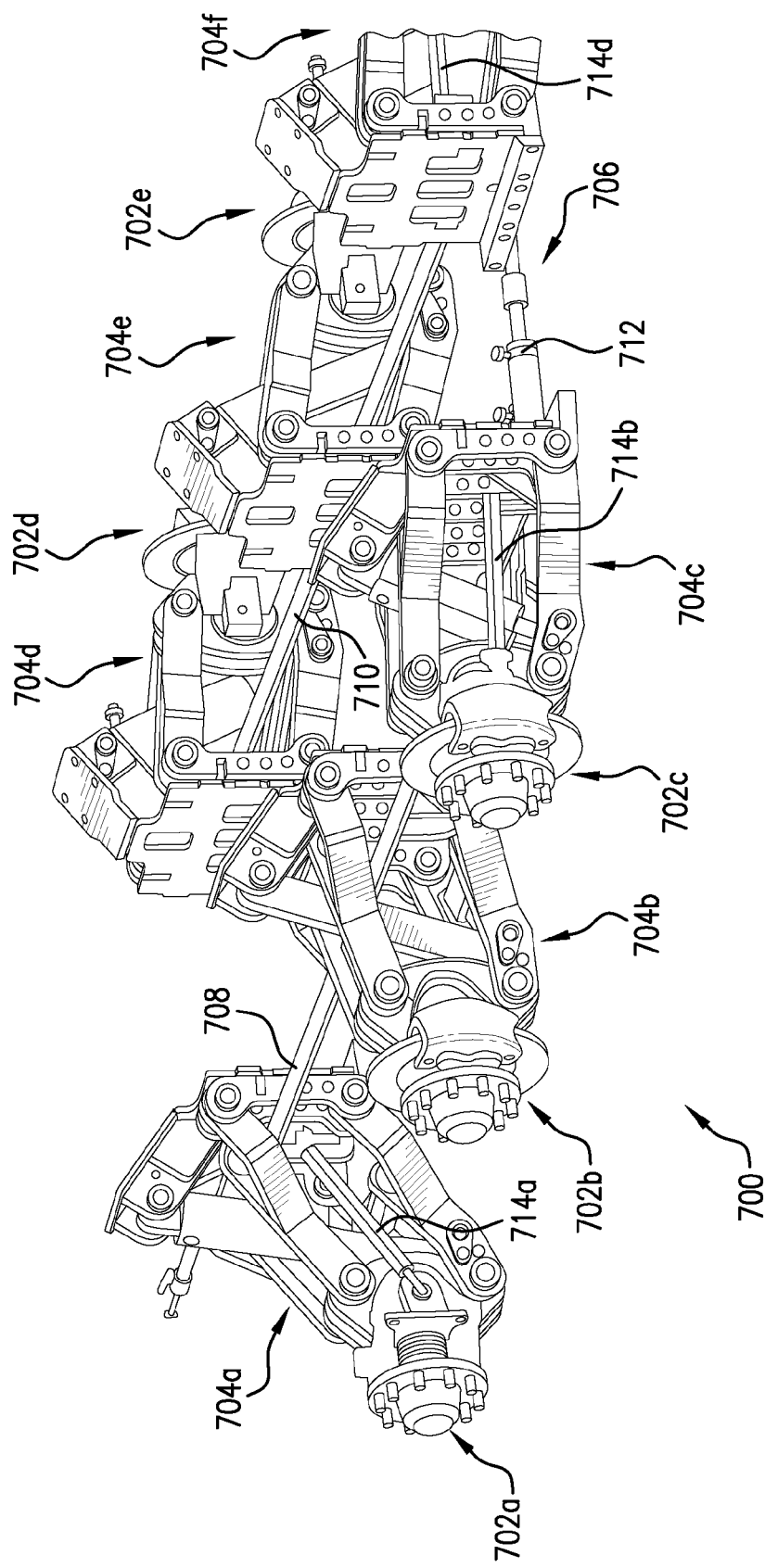
FIG. 7 is a perspective view showing a six-wheel farm implement with a steering system and independent suspension according to an embodiment of the present invention.
Figure 8:
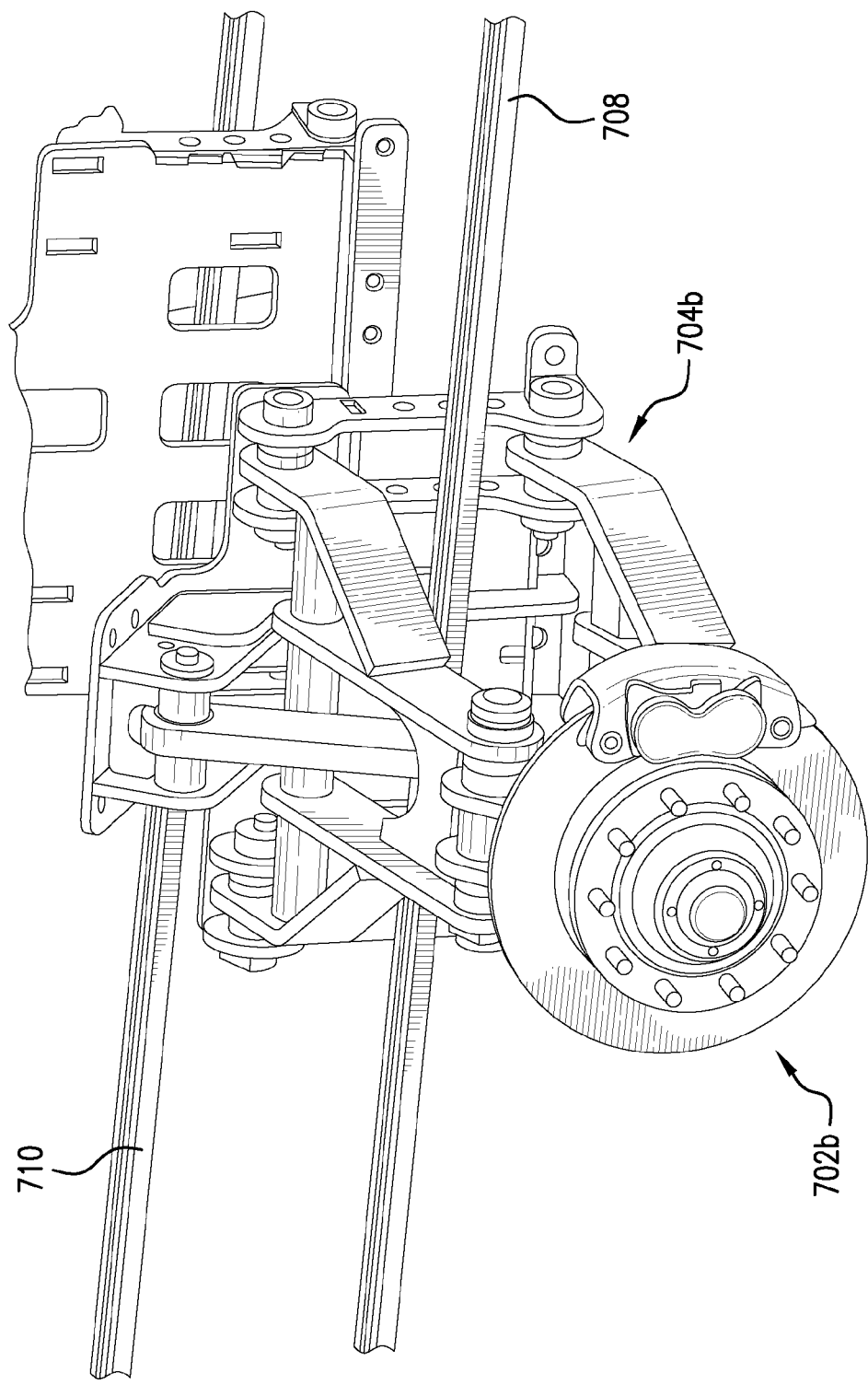
FIG. 8 is a perspective view showing a middle wheel in a six-wheel farm implement with a steering system and independent suspension according to an embodiment of the present invention.

FIGS. 7 and 8 show a farm implement 700 with six wheels according to an embodiment of the present invention. The six-wheel farm implement includes six wheel assemblies 702a-f (702f not shown) and an independent suspension 704a-f at each wheel assembly. In this embodiment, the independent suspension systems 704a-f and the wheel assemblies 702a-f are preferably the same as the four-wheel farm implement discussed above.

The steering system 706 in the six-wheel farm implement 700 includes a right rocker shaft 708, a left rocker shaft 710, a cross linkage 712, and tie rods 714a-d at the front wheel assemblies 702c and 702f and the back wheel assemblies 702a and 702d. According to an embodiment of the present invention, the middle wheel assemblies 702b and 702e are not coupled to the steering system 706. The middle wheel assemblies 702b and 702e are configured to passively rotate the wheel to a steering angle. In an embodiment of the present invention, the middle wheel assemblies 702b and 702e can be configured to remain fixed at a generally straight steering angle (i.e., zero degrees).

The independent suspension systems 704a-f can be configured such that the independent suspension systems 704a-f on the same side of the farm implement 700 move the front wheel assembly and the rear wheel assembly in the opposite direction, e.g., when the front right independent suspension 704c moves the front right wheel assembly 702c in a generally downward direction, the back right independent suspension 704a moves the back right wheel assembly 702a in a generally upward direction. The suspension for the middle wheel assembly 704b and 704e can be configured to maintain the middle wheel assembly at a position between the front wheel assembly and the rear wheel assembly.

From the above it will be appreciated that the independent suspension system of the present invention allows one or more of the wheels of a towed farm implement to move or be moved in a generally vertical direction while maintaining a generally vertical orientation, longitudinal positioning and steering angle. In certain embodiments, the system also more evenly distributes loads from the wheels to the frame of the towed farm implement so that lighter, less bulky assemblies can be used to construct the frame. It will also be appreciated that various changes can be made to the system without departing from the spirit and scope of the appended claims. For example, the independent suspension can be used with a farm implement having a separate frame as shown or a unibody structure wherein the frame is integrated with other parts of the implement. Also, each wheel assembly and independent suspension can have its own frame member that can be coupled to the frame of the farm implement. Furthermore, while the independent suspension system has been shown as mounting to the frame at two upper and two lower locations, it will be appreciated that more than two upper and/or more than two lower mounting locations can be used. In an alternative embodiment, the generally C-shaped wheel assembly frame shown and described can be replaced by a spherical bearing or ball joint in which the vertical pin extends through the inner diameter of the bearings. In yet another embodiment, the damping device can be disposed outside the openings defined by the upper and lower wheel support assemblies. In still another embodiment, the rocker shafts, linkages and double-acting cylinder of the illustrated embodiment can be replaced by individual cylinders mounted between the frame and the wheels to control rotation of the wheels about the turn axis of the wheel assembly. In another embodiment, the steering system can use the rocker shafts and tie rods coupled to each wheel assembly as illustrated and the cross-linkage can be replaced with a cylinder on each side with one end connected to the frame and the other end connected to the rocker shaft. These and other modifications are intended to be encompassed within the scope of the appended claims.

The invention claimed is:

1. A towable farm implement comprising:
    a frame having a longitudinal axis extending from a back end of said frame to a front end of said frame, said frame further having right and left sides;
    at least two wheel assemblies coupled to said right side of said frame and at least two wheel assemblies coupled to said left side of said frame, each of said wheel assemblies including an upper portion, a lower portion, and a wheel;
    an independent suspension system at each wheel assembly, each independent suspension system including an upper support structure, a lower support structure and a damping device configured to move an associated wheel assembly generally vertically;
    each upper support structure having a first end pivotably coupled to the frame about a first upper pivot axis parallel to said longitudinal axis of said frame, and a second end pivotably coupled to said upper portion of said wheel assembly about a second upper pivot axis parallel to said first upper pivot axis;
    each lower support structure having a first end pivotably coupled to the frame about a first lower pivot axis parallel to said longitudinal axis of said frame, and a second end pivotably coupled to said lower portion of said wheel assembly about a second lower pivot axis parallel to said first lower pivot axis; and
    each damping device having a first end pivotably coupled to said frame, and a second end pivotably coupled to said wheel assembly, wherein each said damping device is angled from vertical such that each said damping device and each said lower support structure form a steering opening;
    at least one rocker shaft on each side of said frame configured to translate turning motion of a wheel to at least one other wheel on the same side of said frame, wherein a portion of each at least one rocker shaft is positioned in one of said steering openings on its respective side of said frame;
    wherein each of said independent suspension systems is configured to move a wheel assembly in a generally vertical direction.

2. The towable farm implement of claim 1, wherein a first independent suspension system is configured to move said respective first wheel assembly in the opposite direction a third independent suspension system moves said respective third wheel assembly, and a second independent suspension system is configured to move said respective second wheel assembly in the opposite direction a fourth independent suspension system moves said respective fourth wheel assembly.

3. The towable farm implement of claim 1, wherein a first independent suspension system is configured to move said respective first wheel assembly after a third independent suspension system moves said respective third wheel assembly a substantial distance, and a second independent suspension system is configured to move said respective second wheel assembly after a fourth independent suspension system moves said respective fourth wheel assembly a substantial distance.

4. The towable farm implement of claim 1, wherein said farm implement includes at least three wheel assemblies coupled to said right side of said frame and at least three wheel assemblies coupled to said left side of said frame.

5. The towable farm implement of claim 4, wherein front and rear wheel assemblies on each side of said frame include steerable wheels, and wherein wheel assemblies disposed between said front and rear wheel assemblies include wheels maintained at a fixed steering angle.

6. A towable farm implement, comprising:
    a frame having a longitudinal axis extending from a back end of said frame to a front end of said frame, said frame further having right and left sides;
    at least two wheel assemblies coupled to said right side of said frame and at least two wheel assemblies coupled to said left side of said frame, each of said wheel assemblies including an upper portion, a lower portion, and a wheel;
    an independent suspension system at each wheel assembly, each independent suspension system including an upper support structure, a lower support structure and
    a damping device configured to move an associated wheel assembly generally vertically;
    each upper support structure having a first end pivotably coupled to the frame about a first upper pivot axis parallel to said longitudinal axis of said frame, and a second end pivotably coupled to said upper portion of said wheel assembly about a second upper pivot axis parallel to said first upper pivot axis;
    each lower support structure having a first end pivotably coupled to the frame about a first lower pivot axis parallel to said longitudinal axis of said frame, and a second end pivotably coupled to said lower portion of said wheel assembly about a second lower pivot axis parallel to said first lower pivot axis;

each damping device having a first end pivotably coupled to said frame, and a second end pivotably coupled to said wheel assembly, wherein each said damping device is angled from vertical such that each said damping device and each said lower support structure form a steering opening;

at least one rocker shaft on each side of said frame configured to translate turning motion of a wheel to at least one other wheel on the same side of said frame, wherein a portion of each at least one rocker shaft is positioned in one of said steering openings on its respective side of said frame;

a tie rod at each wheel assembly coupled to at least one rocker shaft and configured to transmit rotation of a rocker shaft to said wheel; and a cross linkage configured to translate the rotation of at least one rocker shaft on a side of said frame to at least one rocker shaft on an opposite side of said frame, wherein each of said independent suspension systems is configured to move a wheel assembly in a generally vertical direction.

7. The towable farm implement of claim 6, wherein each of said tie rods includes a coupling member approximately perpendicular to said at least one rocker shaft and a tie rod member coupled to said coupling member at a first end.

8. The towable farm implement of claim 6, wherein each of said at least four wheel assemblies includes a wheel support member and a coupling link pivotably coupling said wheel support member to said upper portion of said wheel assembly and said lower portion of said wheel assembly, and said wheel is rotatably coupled to said wheel support member.

9. The towable farm implement of claim 8, wherein each of said tie rods is coupled to said wheel support member of each wheel assembly.

10. The towable farm implement of claim 6, where said cross linkage is a double ended cylinder.

* * * * *